Figure 1:
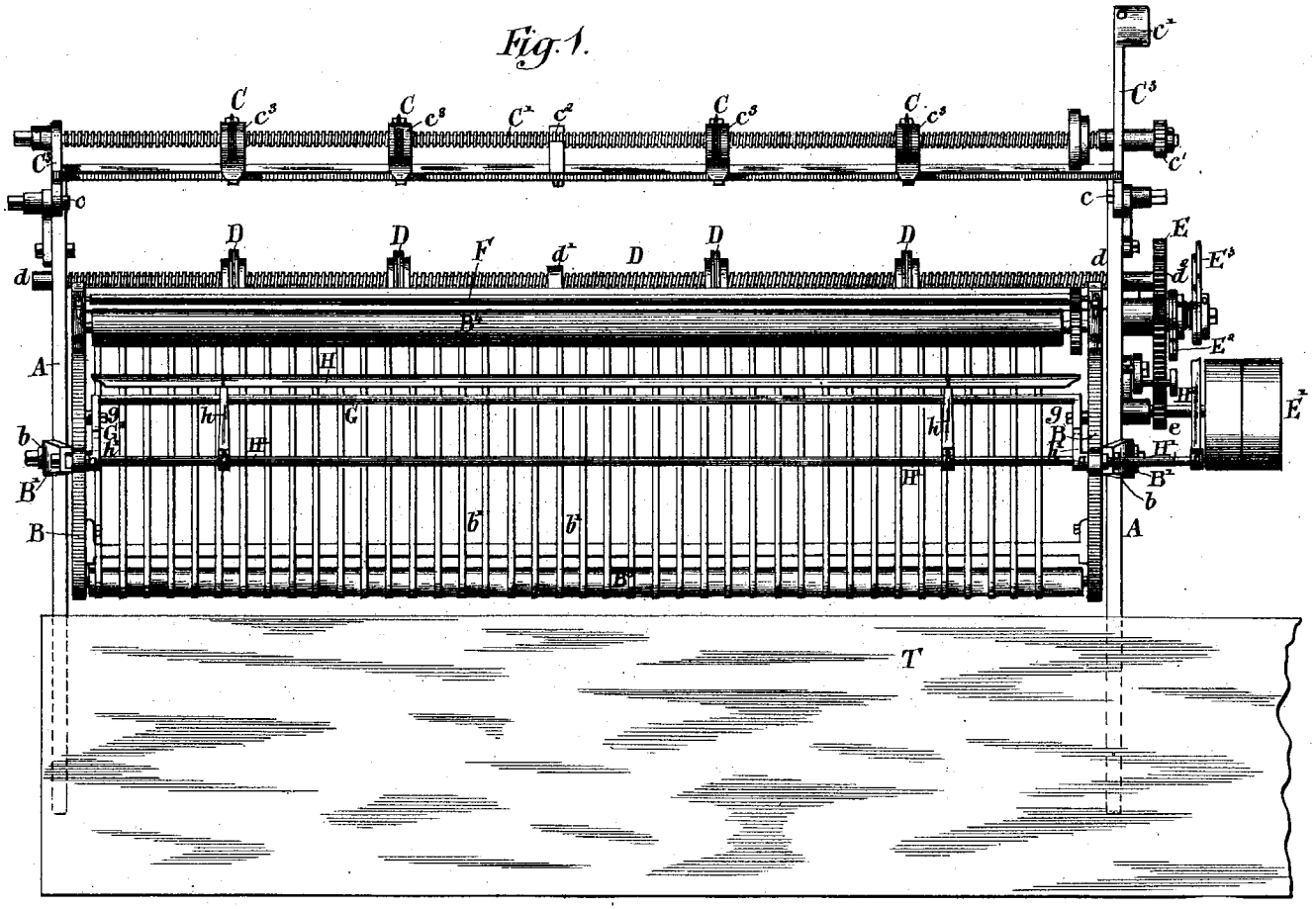

3 Sheets—Sheet 1.

A. G. BURTON.

PERFORATING MACHINE.

No. 10,652. Reissued Oct. 20, 1885.

Witnesses
Jno. H. Stockett.
Louis M. T. Whitehead.

Inventor:
Augustus G. Burton.
By W. E. Dayton
Attorney

N. PETERS, Photo-Lithographer, Washington, D. C.

A. G. BURTON.
PERFORATING MACHINE.
No. 10,652. Reissued Oct. 20, 1885.
Fig. 2
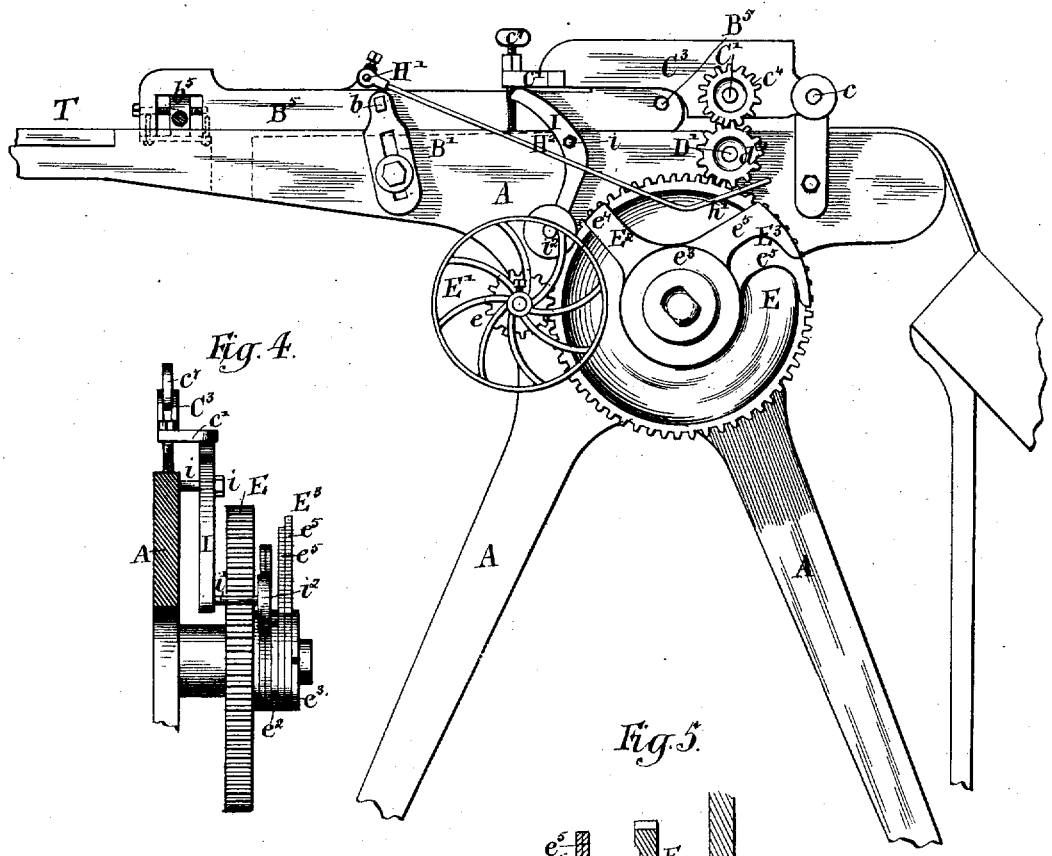
Fig. 4.
Fig. 5.
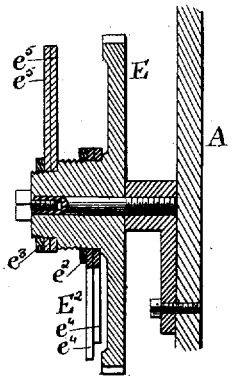
Fig. 6.
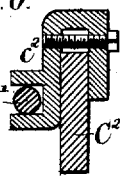
Witnesses:
Jno. H. Stockett,
Louis M. T. Whitehead.
Inventor:
Augustus G. Burton.
by W. E. Dayton
Attorney
N. PETERS, Photo-Lithographer, Washington, D. C.

A. G. BURTON.
PERFORATING MACHINE.
No. 10,652. Reissued Oct. 20, 1885.
Fig. 7.
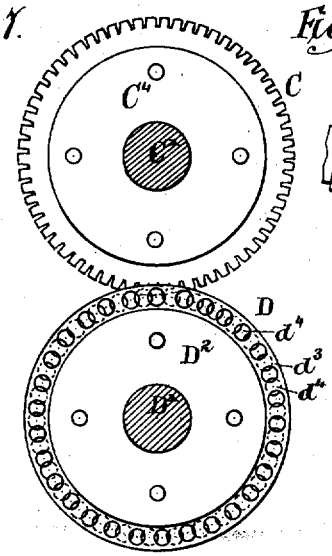
Fig. 8.
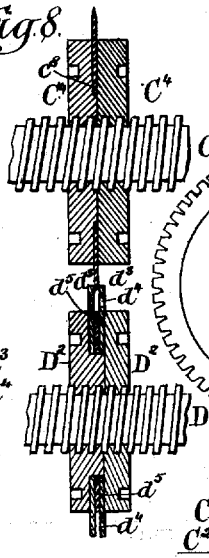
Fig. 9.
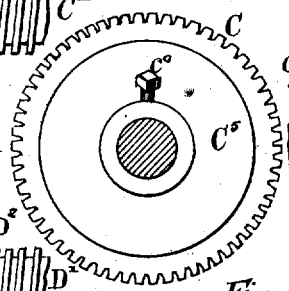
Fig. 10.
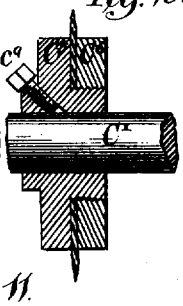
Fig. 11.
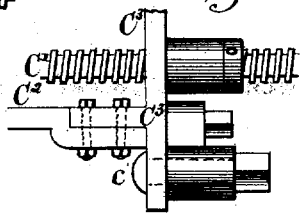
Fig. 3.
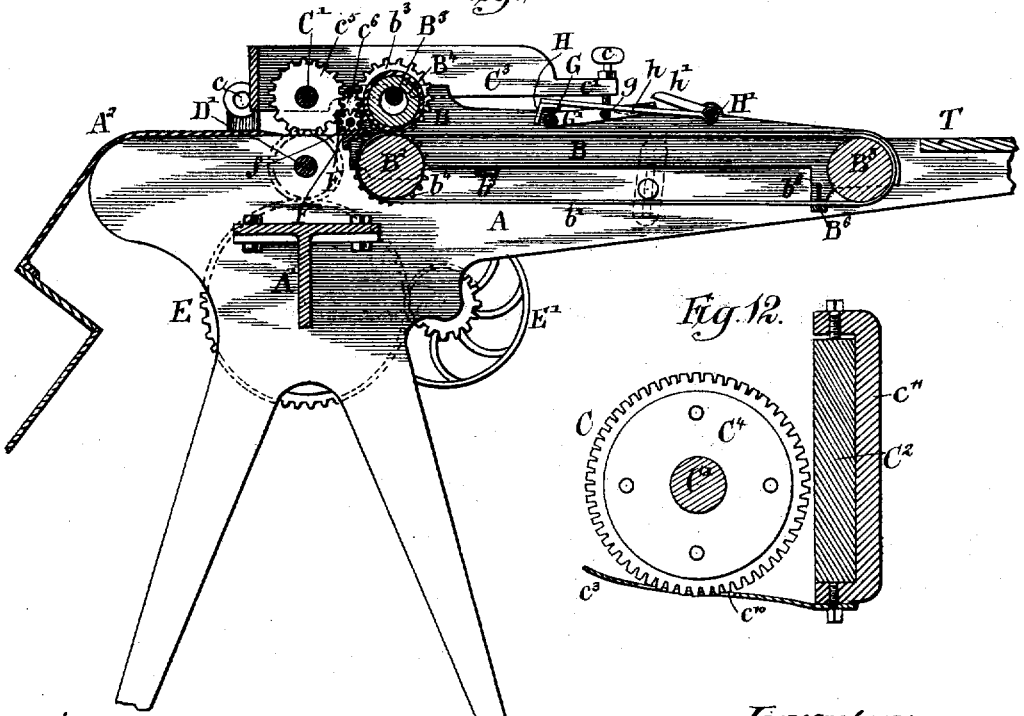
Fig. 12.
Witnesses:
Jno. H. Stockett
Louis H. Whitehead.
Inventor:
Augustus G. Burton.
By W. E. Dawson
Attorney
N. PETERS, Photo-Lithographer, Washington, D. C.

UNITED STATES PATENT OFFICE.

AUGUSTUS G. BURTON, OF CHICAGO, ILLINOIS.

PERFORATING-MACHINE.

SPECIFICATION forming part of Reissued Letters Patent No. 10,652, dated October 20, 1885.

Original No. 302,189, dated July 15, 1884. Application for reissue filed July 18, 1885. Serial No. 171,968.

*To all whom it may concern:*

Be it known that I, AUGUSTUS G. BURTON, of Chicago, in the county of Cook and State of Illinois, have invented certain new and useful Improvements in Perforating-Machines; and I do hereby declare that the following is a full, clear, and exact description thereof, reference being had to the accompanying drawings, and to the letters of reference marked thereon, which form a part of this specification.

This invention relates to machines for perforating or partially severing sheets of paper to facilitate the separation of such sheets in the line of the perforations.

The invention relates to the construction of the frame in such machines, to the construction of the matrices, to the manner of mounting the feed-frame and the cutter-shaft upon the frame, to the mode of securing the cutters and matrices on their shafts, to devices for controlling the feed of paper to the cutters, and to several other matters, as will hereinafter more fully appear.

Among the general objects of the improvement are to secure a better action in the feed mechanism, a more reliable performance by the cutters or perforators, and to facilitate adjustment of the perforating mechanisms.

The invention consists in the several novel features of construction set forth and claimed below.

In the drawings, Figure 1 is a top view of the machine. Fig. 2 is an end elevation. Fig. 3 is a vertical section between and parallel with the ends of the machine. The remaining nine figures are details.

A A are parallel uprights, forming the ends of the frame, and A′ is a cross-beam connecting said uprights. The uprights A are shown as being horizontally extended at their top in the form indicated in the drawings, for the purpose of furnishing hinged attachment to other parts, and also in one direction to support a feed-table, T.

B B are ends of a carrier-frame, pivoted at *b b* to adjustable lugs or arms B′, secured to the uprights A, and connected by a cross-bar, $B^6$. Said carrier-frame is provided with rollers $B^2$ and $B^3$, over which passes a continuous apron, herein represented as constituted of a number of parallel bands, *b*′, severally guided by the pins $b^6$ on the cross-bar $B^6$, but which may be one broad belt of canvas or other material. Said carrier-frame proximates the cutters, hereinafter to be described, and is pivoted, as set forth, to enable it to be swung up out of the way to afford access to the cutters and matrices for the purpose of accurate adjustment thereof, as will further appear to be desirable.

C C are the cutters or perforators, which consist each of a disk of metal brought to a thin edge and notched, as shown more clearly in the enlarged views thereof, Figs. 7, 9, and 12. Said cutters are mounted movably on a rotating shaft, C′, which in turn is mounted on the frame $C^2$ $C^3$, hinged to the uprights at *c c*.

D D are matrices, which will be hereinafter more specifically described, mounted adjustably on the rotating shaft D′, having bearings at *d* in the uprights A, and arranged to stand beneath the cutter-shaft C′ when the latter is in position for operation.

E is a spur-wheel axially supported from and exterior to one of the uprights A on a suitable spindle and driven from the pinion *e*, on the shaft of the pulleys E′, which is similarly supported from the same upright A. The matrix-shaft D′ is driven from the spur E by the pinion $d^2$, affixed to said shaft, which pinion in turn drives the cutter-shaft C′ by the equal pinion $c^4$, all arranged as shown distinctly in Fig. 2. Within the frame the shaft C′ is provided with the spur $c^5$, for the purpose of driving the feed-apron, and to this end the shaft $B^5$, reaching from one end piece B of the oscillating feed-frame A to the other, is provided with a pinion, $b^3$, meshing with the pinion $b^4$ on the roller-shaft $B^2$. A loose pinion, $c^6$, arranged intermediate to $c^5$ and $b^3$, and pivoted on the feed-frame, gives movement to the feed-apron in the desired direction, and the several wheels, $d^2$, $c^4$, $c^5$, $b^3$, and $b^4$, being provided with the same number of teeth, the several shafts actuated thereby rotate at the same speed. The shaft $B^5$ is surrounded by the loose drum $B^4$, which, resting on the apron *b*′, or on the paper being fed to the machine, is carried by the apron rather than by the shaft $B^5$, upon which it is loosely mounted.

F, Fig. 3, is a narrow plate extending from one end piece to the other of the feed-frame B, arranged to form a bridge over which the paper passes from the feed-roller $B^2$ to the perforating mechanisms, and which serves as a guide to direct the edge of the paper to the cutters. Parallel with and a little above this table F is a small shaft, F′, Figs. 1 and 3, having a pinion, *f*, which meshes with $e^6$, so as to advance on its lower surface in the same direction as the paper. The object of this shaft is to guide the paper level to the perforators, its rotation serving to bend down any upturned corners of the sheet.

G is another guide-shaft, mounted in the arms G′, pivoted between their ends at *g* to the end bars, B, of the feed-frame.

H is a vibrating gage and presser-bar, arranged to rest on the paper in advance of the shaft G, and connected by arms *h* with the oscillating shaft H′, which is mounted on the arms B B. Said shaft H′ extends beyond the frame A on the side at which the driving mechanism is located, as plainly shown in Fig. 1, where it is provided with an arm, $H^2$, which engages a cam on the shaft of spur E, to lift the presser-bar H from the paper at intervals, as and for purposes that will be presently more fully set forth. In the oscillation of the shaft H′ the shaft G is made to rise and fall, so as to clear the paper when the presser H rests thereon, and to fall upon the paper when said presser is lifted therefrom. For this purpose short arms *h′* are secured to the shaft H′ in position to strike the free ends of the vibrating arms G′ on their upper surfaces, as indicated in Figs. 1 and 3.

The cutter-frame $C^2$ $C^3$, bearing the cutter-shaft C′, being hinged at *c*, is adapted to swing upward, so as to throw the shaft out of gear, and also so as to lift the cutters C clear of the matrices D. Two purposes are served by thus mounting the cutter-shaft—namely, to facilitate adjustment of the cutters upon their shaft, as will be later explained, and to allow the paper to pass the cutters at times without being perforated thereby. To effect the latter object, which requires but a short movement of the cutter-frame, a bent lever, I, is pivoted to the frame A at *i*, its upper arm rising beneath the projection *c′* of the adjacent frame-piece $C^3$, and its lower arm provided with a spindle, *i′*, and a roller, $i^2$, arranged to engage a cam or arm, $E^2$, carried with the spur E. Striking the wheel $i^2$, the cam lifts the frame $C^3$ on its hinges, and raises the cutters out of engagement with the matrices, and allows the paper to pass the cutters unperforated. When the cam passes the roller, the cutter-frame falls and the cutters again work.

In Fig. 5 the construction and mode of adjustably securing the cams $E^2$ and $E^3$ to the spur are plainly shown. Said cams are fitted to the hub, so as to be set at any position, and are respectively clamped in place by the spanner-nuts $e^2$ $e^3$. For the purpose of varying the width of the acting faces of these cams, each is composed of two or more parts or plates, as $e^4$ or $e^5$, which are of equal length, and may be set one in advance of the other, (more or less,) as required, and as indicated of the plates $e^5$ in the cam $E^3$, Fig. 2. The face of the wheel $i^2$, or that of the arm $H^2$, is made broad enough to be struck by either plate of the appropriate cam, and is therefore sustained until both have passed. An adjusting-screw, $c^7$, limits the fall of the cutter-frame, and permits the cutters and matrices to be vertically adjusted, as may be desired. By suitably locating and adjusting the several cams $E^2$ and $E^3$, the feed-gage is lifted at the proper time to allow the sheet placed against the same to advance to the perforators, and the perforators are separated to produce the desired blank spaces for stubs, binding-margins, &c., at the proper point or points on the sheet.

I next proceed to describe the novel features of the perforating mechanism.

The cutters C, as already stated, consist of disks of metal brought to a thin true edge and notched at short intervals, as shown in Figs. 7, 9, and 12. Said disks are of tempered steel, cooled between rigid plates to make them perfectly flat and true, and provided with a large central circular aperture, as indicated in Figs. 8 and 10. The disk is clamped firmly between two strong circular plates or nuts, $C^4$ $C^4$, Fig. 8, one of which is provided with an annular concentric shoulder, $c^8$, and both of which are centrally apertured and threaded to fit the threaded shaft C′. Each plate operates in this case as a set-nut to the other. An alternative, and in some respects preferable, mode of construction of the clamps for holding the cutter-disks is shown in Figs. 9 and 10, wherein one plate, $C^5$, is provided with a threaded hub, upon which the opposite plate, $C^6$, is fitted, and the former is fitted to the shaft C′. In the figure last specified the shaft is shown as being plain, and the cutter-holders as being secured thereto by a set-screw, $c^9$; but the shaft may in this case be threaded, and the cutter-holder held either by a set-screw or by set nuts on the shaft bearing on both sides of the holder.

The matrix D is composed of two disks, $d^3$ $d^3$, having an intermediate smaller disk of metal or paper, $d^5$, between them. Said disks are held by plates $D^2$ $D^2$, and secured to the shaft D′ in a manner similar to either one of the modes of securing the cutters above set forth. By means of the intervening smaller disk, $d^5$, a narrow annular groove is formed between the edges of the disks $d^3$ $d^3$, into which the notched edge of the cutter-disk C is arranged to enter closely. For the purpose of changing the distance between the disks $d^3$, as may be found necessary in adjusting them to the cutters, and in providing for cutters of different thicknesses, the disks $d^5$ may obviously be made of a greater or less thickness, or two or more such disks may be used to accomplish the same result. Just within the edge of each disk $d^3$ a continuous series of apertures, $d^4$, is provided, which apertures afford escape for the particles of paper punched or detached from the sheet by the cutter C, for it is found in practice that such particles will be detached no matter how sharp said cutter may be made. In order to secure the more perfect escape of these detached particles of paper, the apertures of the two disks $d^3$ forming the matrix are set in alternation, those of one with those of the other, and in this manner all accumulation of paper between the disks, which would tend to either spread them or to clog the groove between them, is wholly prevented. By means of this provision for discharging the groove the disks continue to closely hug the cutter, and a clean and continuous series of perforations is made.

For the purpose of stripping the paper from the cutters C a plate, $c^3$, having a narrow slot, $c^{10}$, Fig. 12, in which the edge of the cutter-disk may run, is secured to the adjacent frame-piece $C^2$ by a movable clamp, $c^{11}$.

In the case of machines having long shafts C′ and D′, said shafts are centrally supported by movable lugs $c^2$ $d'$, fitted to admit and guide them; and to provide for the excessive expansion of long threaded shafts C′ and D′ said shafts will be longitudinally retained at their geared ends only, having at their opposite ends free longitudinal movement in their bearings. The cutter-frame $C^2$ $C^3$ is sufficiently held to its work by its weight; but, if desired, it may be additionally so held by bolts or other suitable means. For the purpose of inspection or adjustment of the cutters on their shaft, the frame $C^2$ $C^3$ is readily tilted backward to the position shown in Fig. 1; and to facilitate the removal and insertion of the shaft C′ the cross-bar $C^2$ may be connected with the end frame-piece, $C^3$, at one or both ends, in the manner shown in Fig. 11, instead of being of the same piece therewith, as shown in Fig. 1.

In order to inspect or adjust the matrices D and cutters C more readily, the feed-frame B is tilted upon its pivotal bearings $b$. Any suitable stop may be employed to arrest the tilting feed-table in its working position.

At $b^5$, Fig. 2, is shown an adjustable bearing for each end of the apron-roller $B^3$, whereby the tension of said apron may be regulated at will.

J is a receptacle of the ordinary form, to receive the sheets as fast as they pass the machine.

In feeding in the paper to be perforated, the sheets are separately and successively pushed beneath the shaft G against the bar H, which is carefully arranged parallel with the perforating-shafts C′ D′. At the proper moment the bar is raised by the cam $E^2$ and the sheet is borne inward by the moving feed-apron, upon which it rests. Upon the raising of the bar H the arms $h'$ release the arms G′, and the shaft G therefore immediately falls upon the paper being fed. This shaft, which rotates freely, serves to retain the paper in proper position on the feed-apron until it is engaged by the roller $B^4$ or the cutters. When the sheet is thus engaged by the said roller or cutters, the bar H again falls upon the paper and the shaft G is raised. The bar is ready to gage the next sheet, but meantime serves to press lightly upon the sheet last fed in and keeps it smooth on the apron. The roller $B^4$ is usually of wood or sheet metal covered with paper, and, being loosely hung on the shaft $B^5$, bears with its weight only upon the sheet being advanced, and conforms to the motion of the sheet as the same is determined by the feed-apron or cutters.

The cutters C and matrices D are carefully adjusted to each other, so that the notched edge of each cutter-disk will fairly enter the annular groove in the edge of the opposite matrix, but only to a very slight extent.

The disks $d^3$ of the matrix are preferably of steel plates, formed by stamping, and are arranged to protrude from the clamping-plates $D^2$ far enough to expose the openings $d^4$. They are separated by the disk $d^5$ only so far as to fairly and closely admit the edge of the disk C, the protruding edges of the matrix-disks possessing sufficient elasticity to insure such close embrace of the cutter-edge without impairing the action of the machine or danger of breaking it. As preferably constructed, the disks $d$, are placed at a less distance apart than the thickness of the cutter-disk, so that the extreme or cutting-edge of the said disk will enter freely between them; but they will be forced apart by the farther entrance of the beveled portion of the edge of the said cutter-disk. By this means the paper is not drawn or puckered by the perforators, but is fairly punctured or perforated by each projection or tooth upon the cutter-edge, any slight depression in the line of the perforations being smoothed by passing the paper over a curved surface at $A^2$ as it leaves the machine. The fibrous particles of paper punched out of the sheet soon accumulate in the groove of the matrix, but find such free escape at the openings $d^4$ that they do not in any degree impair the action of the perforators. In this connection I acknowledge that the making of lateral apertures in supporting webs or rings within a perforated cylinder has been suggested as a means of egress for the detached fragments or small disks punched inwardly through the perforations of the cylinder. The manner of adjusting the perforators longitudinally on the shafts C′ and D′ is obvious.

With reference to the novel features of the perforators, I do not wish to be limited to the circular form here shown, as the same principle of construction and operation may be applied in cutters and matrices having straight edges and a movement toward and from each other for the admission and withdrawal of the paper and for the production of the perforations.

It is obvious that the continuously-grooved matrix permits the use of a cutter having a continuous edge, and that therefore such a cutter may be substituted in place of either of the notched edged cutters shown, for the purpose of severing the paper.

I claim as my invention—

1. In a machine for the purpose stated, the combination, with a cutter, of a matrix having a continuous groove to admit the cutter-edge, and provided with openings for the exit of detached fibers from the groove, substantially as described.

2. In a machine for the purpose stated, the combination, with the cutting-disk, of separated disks $d^3$, provided with lateral openings $d^4$, substantially as and for the purposes set forth.

3. In a machine for the purpose stated, the combination, with the cutter, of a circular matrix having a continuous groove to admit the cutter, said matrix being constructed of two relatively movable parts, whereby the width of the groove between the parts may be varied, substantially as described.

4. In a machine for the purpose stated, the combination, with the cutting-disk, of a matrix composed of separate disks $d^3$, a disk, $d^5$, placed between said disks $d^3$, for holding them at a desired distance apart, and nuts $D^2$, for supporting said disks, substantially as described.

5. The combination, with the cutter beveled at its edge, of the matrix composed of elastic metal disks or plates adapted to yield as the beveled edge of the cutters enters between them, substantially as described.

6. In a machine for the purpose stated, the combination, with a cutter beveled at its edge, of a matrix composed of two separated elastic disks placed at a distance apart less than the thickness of the body of the cutter, substantially as and for the purpose set forth.

7. The combination, with the stationary matrix-shaft D′, mounted in the frame A, of the hinged frame bearing the opposing cutter-shaft C′, and an adjusting-screw, $c^7$, substantially as and for the purpose specified.

8. The combination, with the hinged frame $C^2$ $C^3$, carrying the rotating cutter-shaft C′, of a lever, I, and cam $E^2$, substantially as and for the purpose set forth.

9. In combination with the feeding-apron, the vibrating presser-bar and gage H, and the shaft G, connected to alternately rise and fall, substantially as and for the purpose set forth.

10. The combination, with the feeding-apron, the oscillating shaft H′, bar H, arms $h'$, and cam-arm $H^2$, of the vibrating arms G′, shaft G, and an actuating-cam, $E^3$, substantially as described.

11. The combination, with the feeding-apron, of a loose roller, $B^4$, having free lateral and vertical movement, substantially as described.

12. In combination with the matrix and cutter-shafts, one of which is movable for the purpose of adjustment, the feed-apron arranged to proximate said matrices and cutters and mounted on a movable frame, whereby access is afforded to the matrices and cutters, substantially as described.

13. In combination with the circular cutters and the traveling feed-apron, the intermediate guide-table, F, and the superposed rotating feed-roller F′, actuated positively from the feed-gear, substantially as described.

14. In combination with the hub of the wheel E, two or more cam-plates, as $e^5$, mounted rotatably on said hub, and an interiorly-threaded clamp-nut fitted to the correspondingly-threaded exterior of the hub, whereby the cam-plates may be held in any position by a single central nut, substantially as described.

15. In combination with the shafts C′ and D′, of a perforating-machine having adjustable perforators thereon, and with adjacent parts of the frame, the adjustable supports $c^2$ and $d'$, substantially as and for the purposes set forth.

In testimony that I claim the foregoing as my invention I hereto affixed my signature in presence of two witnesses.

AUGUSTUS G. BURTON.

Witnesses:
C. CLARENCE POOLE,
OLIVER E. PAGIN.